United States Patent [19]

Kimura et al.

[11] Patent Number: 5,522,049
[45] Date of Patent: May 28, 1996

[54] SEMICONDUCTOR DISK DEVICE WITH ATTACHABLE INTEGRATED CIRCUIT CARDS

[75] Inventors: Masatoshi Kimura; Toyofumi Yoshinaka, both of Itami, Japan

[73] Assignee: Mitsubishi Denki Kabushiki Kaisha, Tokyo, Japan

[21] Appl. No.: 236,014

[22] Filed: May 2, 1994

Related U.S. Application Data

[63] Continuation of Ser. No. 864,379, Apr. 6, 1992, abandoned, which is a continuation of Ser. No. 251,027, Sep. 26, 1988, abandoned, which is a continuation of Ser. No. 910,461, Sep. 23, 1986, abandoned.

[30] Foreign Application Priority Data

Sep. 24, 1985 [JP] Japan ................................ 60-211392

[51] Int. Cl.[6] .................................................. G06F 13/16
[52] U.S. Cl. .......................... 395/282; 395/700; 395/442; 395/500
[58] Field of Search ...................................... 395/550, 425, 395/600, 442, 429, 497.01, 282, 283, 281, 700, 500

[56] References Cited

U.S. PATENT DOCUMENTS

| | | | |
|---|---|---|---|
| 4,258,430 | 3/1981 | Tyburski | 364/900 |
| 4,295,205 | 10/1981 | Kunstadt . | |
| 4,385,366 | 5/1983 | Housey, Jr. | 364/900 |
| 4,454,596 | 6/1984 | Wunsch et al. | 364/900 |
| 4,456,971 | 6/1984 | Fukuda et al. | 364/900 |
| 4,522,456 | 6/1985 | Wehrmacher . | |
| 4,718,044 | 1/1988 | Matsuyama | 365/230 |

FOREIGN PATENT DOCUMENTS

| | | |
|---|---|---|
| 58-195975 | 8/1983 | Japan . |
| 2136613 | 9/1984 | United Kingdom . |

OTHER PUBLICATIONS

"Apple Disk Emulators: Axlon, Legend, Pion, and Synetix", written by M. Gilbert, Byte, Feb. 1984 pp. 318–324.

"System Performance, STC4305 Solid State Disk" Storage Technology Corporation.

Gassner et al (Gassner et al, "Halbleigerfloppy sind Schneller," Elektrotechnik, vol. 65, No. 9, May 1983).

Baker et al (Baker et al, "electronic Diskette Unit," IBM Tech. Dis. Bull., vol. 26, No. 4, Sep. 1983, pp. 1855–1857).

Pierce (Pierce, "diskliss Computers Emerge with Proper Mix . . . ," Electronic Design, vol. 31, et al. 21, Oct. 1983, pp. 177–182).

Primary Examiner—Kevin A. Kriess

[57] ABSTRACT

A semiconductor disk device that is capable of processing hardware interface utilizing the basic input/output systems of various and different standard operating systems. This capability is realized by using detachable IC cards as the principal memory elements of the semiconductor disk device.

4 Claims, 4 Drawing Sheets

SEMICONDUCTOR DISK DEVICE WITH ATTACHABLE INTEGRATED CIRCUIT CARDS

This application is a continuation of application Ser. No. 07/864,379 filed on Apr. 6, 1992, now abandoned, which is a continuation of Ser. No. 07/251,027, filed on Sep. 26, 1988, now abandoned, which is a continuation of Ser. No. 06/910,461 filed on Sep. 23, 1986, now abandoned.

FIELD OF THE INVENTION

The present invention relates to a semiconductor disk device as an external memory device for storing information in such as a computer, a mini computer, or a personal computer.

BACKGROUND OF THE INVENTION

FIG. 6 shows a floppy disk drive device (hereinafter referred to as "FDD device") as a conventional external memory device. This is a FDD device of a personal computer which is generally well known and well used. In FIG. 6, the reference numeral 7 designates a FDD device, and the reference numeral 1 designates a personal computer. In this personal computer 1, the reference numeral 2 designates a central processing unit (hereinafter referred to as "CPU"), the numeral 4 designates a standard bus thereof, the numeral 3 designates a floppy disk controller (hereinafter referred to as "FDC") which is connected to the standard bus 4. The reference numeral 5 designates an operating system (hereinafter referred to as "OS") which is a standard software system for operating the personal computer 1. Besides, the memory section, the display control section, and the key control section are not illustrated for simplification.

FIG. 8 shows a construction of an OS called CP/M which is commonly used in a personal computer as the above-described OS 5. In FIG. 8, the basic constitution of the software of CP/M comprises a console command processor (CCP) 16, a basic disk operating system (BDOS) 17, and a basic input/output (I/O) system (BIOS) 18.

FIG. 7 shows a basic construction of the FDD device. In FIG. 7, the reference numeral 12 designates a reading out magnetic head, the numeral 8 designates a reading out control section for controlling the reading out magnetic head 12. The reference numeral 13 designates a writing in magnetic head, and the reference numeral 9 designates a writing in control section for controlling the writing in magnetic head 13. The reference numeral 11 designates a mechanism section, and the reference numeral 10 designates a mechanism control section for controlling the mechanism section 11. The reference numeral 14 designates a floppy disk. These portions are controlled through the FDD I/O bus 6.

FIG. 9 shows a prior art semiconductor disk device 20 which is connected to the personal computer 1 as an external recording material. As shown in FIG. 9, the conventional semiconductor disk device 20 comprises a bus conversion circuit 21, a memory circuit 22, and a battery 23. The reference numeral 19 designates an I/O bus, and this is controlled under the above-described BIOS 18 in the personal computer 1.

The operation of the external storing system in the prior art FDD device will be described. This system is commonly used in a terminal such as a personal computer, and its operation is reported in an operation manual or an article. Only the summary thereof will be described.

The recording format of the floppy disk 14 is standardized as IBM format, and those which are IBM formated are used for the floppy disks 14. In the IBM format, the size of the disk, the track number/side, and the sector format are defined, and the floppy disks in accordance with these definitions have the compatibility. Generally, as means for controlling the floppy disk 14, a FDC 3 is provided which conducts a control in accordance with the IBM format through the standard bus 4 of the personal computer 1 as shown in FIG. 6. This FDC 3 conducts an interface processing with the CPU 2 as well as conducts the reading out and writing in of the floppy disk 14 in the FDD device 7 through the FDD I/O bus 6.

The floppy disk 14 has generally a configuration of a standard 45-rpm record, and this is produced by plating magnetic material on mica, and information is magnetically recorded therein. When the power supply of the FDD device 7 is applied, the mechanism control section 10 and the mechanism section 11 operate, and the floppy disk position 14 is automatically determined and is rotated at a predetermined speed. The reading out from and writing in into this floppy disk 14 of information is conducted by the reading out head 12 and the writing in head 13, respectively. These heads are generally provided on a carriage connected to a stepping motor provided at the mechanism portion 11, and these heads are produced of stainless copper. The reading out and writing in of the information at a desired track position and sector position are conducted by moving the heads 12 and 13 on a circular plate in a direction towards the center of the floppy disk or in the reverse direction. The control of the movements of these heads 12 and 13 is conducted by operating the stepping motor of the mechanism section 11 in accordance with the track number from the signal output on the FDD I/O bus 6. The signal from the reading out head 12 is amplified by the reading out control section 8 before being outputted because the initial signal is weak.

The operation of the CP/M OS 5 will be described with reference to FIG. 8. The CCP 16 and the BDOS 17 are fixed sections which do not change in accordance with the user, and the BIOS 18 is a section which depends on the physical hardware interface of the system and varies as the system varies. Usually the CCP 16 processes a command from the key board, and the BDOS 17 processes a file of the disk. The BIOS 18 has an I/O subroutine such as key processing, display processing, print out processing, or disk I/O processing linked to the OS 5, and even when a FDD device is connected as an external memory device, the BIOS 18 is completely file-controlled under the OS 5.

Next, the operation in a case where a semiconductor disk device shown in FIG. 9 is used as an external memory device will be described.

In this case a semiconductor disk 20; comprising a bus conversion circuit 21, a memory circuit 22, and a battery 23; is connected to the I/O bus 19 which is a hardware interface supported by the BIOS 18, and the bus conversion circuit 21 is provided between the I/O bus 19 and the memory circuit 22 because the I/O bus 19 controlled by the BIOS 18 and the bus of the memory circuit 22 generally have different structures. The information of the memory circuit 22 is stored with the use of the battery 23. This semiconductor disk device 20 conducts the similar operation as that of the above-described FDD device because the disk device 20 is controlled by the BIOS 18, and it is also made possible to transfer information freely between the FDD device 7 and the semiconductor disk device 20 in consequence of the file-controlling function of the BDOS 17. The difference between the semiconductor disk device and the FDD device 7 is that the semiconductor disk can conduct an electrical high speed information processing.

The following are disadvantages in the prior art FDD device.

(1) Its mechanical structure creates a restriction in the endurance of the rotating portion and the head portion at a continuous operation.

(2) The presssing of the head against the magnetic surface reduces the life-time of the floppy disk.

(3) The floppy disk has a size of 5 to 8 inches diameters requiring a large space for their storage. Furthermore, when the handling or carrying of the floppy disk, one must safeguard from temperature extremes and the folding or the curving of the disk, to protect the magnetic surface.

(4) The operation speed is quite low because the reading out and writing in is conducted mechanically and magnetically.

(5) The data error ratio is large compared to the semiconductor memory.

Although the above-described disadvantages of the FDD device are improved by using a semiconductor disk, the prior art semiconductor disk has the following drawbacks.

(1) The memory circuit is large in size, fixed, and not portable.

(2) A partial default of the memory circuit may possibly become a fatal wound.

(3) The utility value of information such as an application software stored in the memory circuit is low.

(4) The contents of all the memory circuits will vanish due to a battery fault.

(5) It is difficult to change the memory element or to enlarge the memory capacity of the device, and therefore, the maintenance and inspection are complicated.

The conventional FDD device and semiconductor disk device have the above-described disadvantages.

SUMMARY OF THE INVENTION

It is an object of the present invention to provide an improved semiconductor disk device having the advantages of the both of the conventional devices, that is, the portability of the floppy disk, and the high speed of the semiconductor disk device.

Other objects and advantages of the present invention will become apparent from the detailed description given hereinafter; it should be understood, however, that the detailed description and specific embodiment are given by way of illustration only, since various changes and modifications within the spirit and scope of the invention will become apparent to those skilled in the art from this detailed description.

According to the present invention, there is provided a semiconductor disk device operable under a basic input/output system of a standard operating system for processing a hardware interface of each system which is different from those of the other systems, wherein said device is designed to accept a detachable IC card as a principal memory material.

DETAILED DESCRIPTION OF THE PREFERRED EMBODIMENTS

Figure 1:
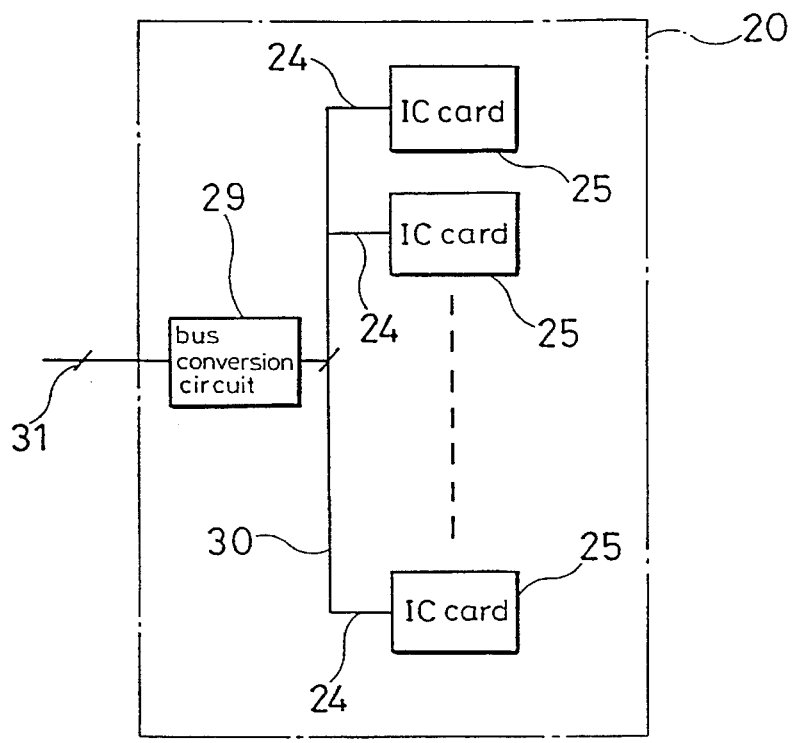
FIG. 1 is a block diagram showing a semiconductor disk device as an embodiment of the present invention.

In order to explain the present invention in detail, reference will be particularly made to FIG. 1.

Figure 2:
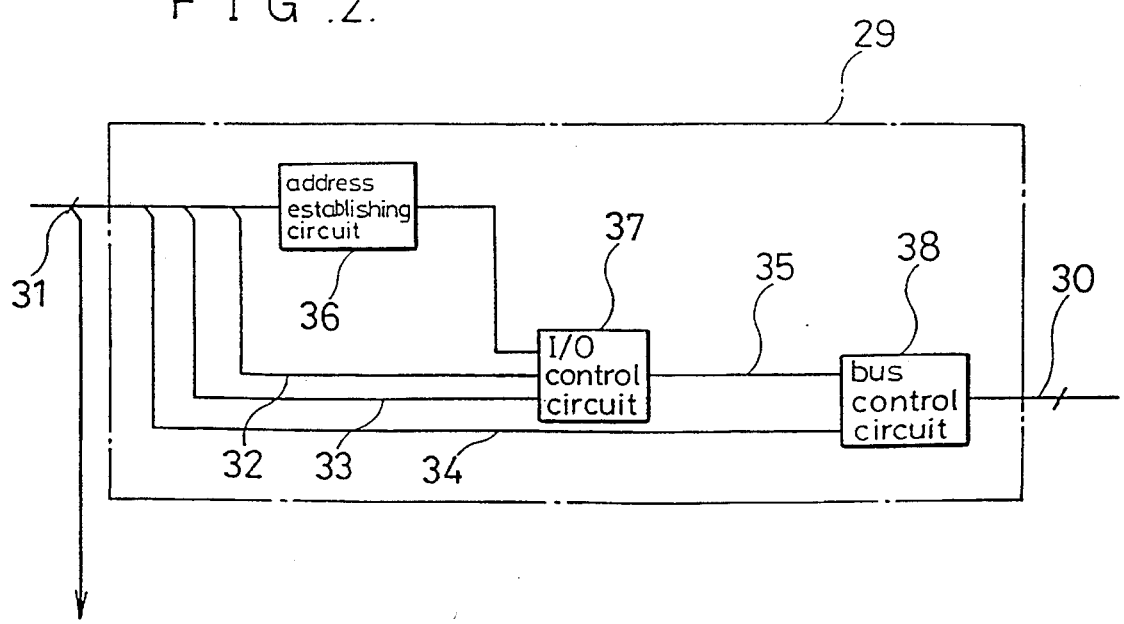
FIG. 2 is a diagram showing a construction of the bus conversion circuit of the device.

In FIG. 1, the reference numeral 25 designates an IC card as a principal recording material of the semiconductor disk device 20. This is produced as a card (about 54×85.6 mm), and is used for storing information. Similarly as described above, in connection with the conventional FDD device and semiconductor disk device, the device of this embodiment requires a bus conversion between the I/O bus 31 under the control of the BIOS and the memory bus 24 of the IC card 25 so as to operate this device under a standard OS. For that purpose as seen in FIG. 2, there is provided a bus conversion circuit 29 which conducts a bus conversion from the address bus 32, the control bus 33, and the data bus 34 to a mother board bus 30 which is required for accessing the IC card 25 by the address establishing circuit 36, the I/O control circuit 37, and the bus control circuit 38. The reference numeral 35 designates a bus control signal.

Figure 3:
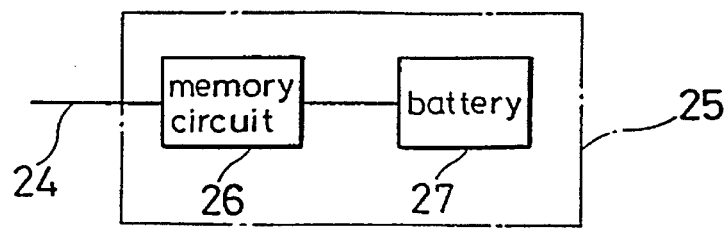
FIG. 3 is a diagram showing a function block of an IC card used in the device.
Figure 4:
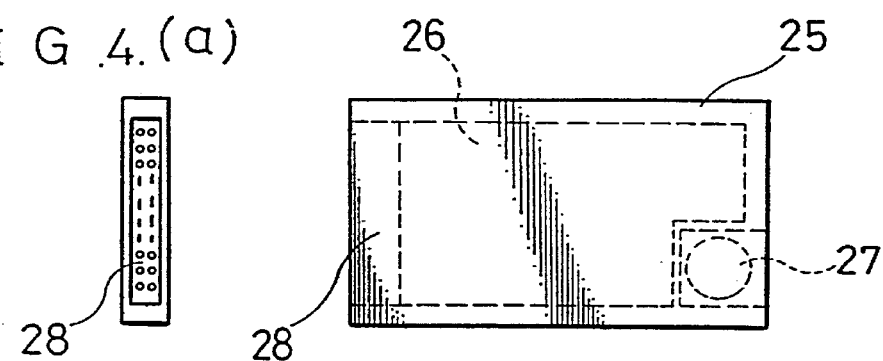
FIGS 4(a) and (b) are a side view and a plan view showing a construction of the IC card shown in FIG. 3.

FIGS. 3 and 4 show the function block and a physical construction of IC card 25, respectively. As shown in these Figures, a memory circuit 26 and a battery (a primary battery or a secondary battery) 27 are mounted in the IC card 25 by a thin width mounting production technique, and a connector 28, to be connected to the socket provided at the side of the semiconductor disk device, is mounted on the IC card 25 as an integrated structure so as to make the card detachable. In the memory circuit 26, a memory element is mounted on a bare chip or on a SOP (Small Outline Package), in order to make the memory circuit 26 thin. It is convenient that the battery 27 is provided with a replacement mechanism in the semiconductor disk device.

In this embodiment, with such a construction, an IC card, which is detachable from the device, is used as information storing means, and this IC card 25 with the battery 27 mounted on it can be used as a portable memory device and function like the floppy disk sheet. Furthermore, when a semiconductor disk device shown in FIG. 1 is constituted by this IC card 25, a semiconductor memory device can be constructed freely and arbitrarily in accordance with the required memory capacity.

The operation of this device will be described below.

As described above in the standard OS of disk I/O processing, I/O bus 31 is opened by the BIOS under the BDOS. This bus 31 generally comprises the address bus 32, the control bus 33, and the data bus 34, and in order to operate this bus similarly as in the prior art FDD device a bus conversion circuit 29 is required to be provided between the bus 31 and the mother board bus 30 which is a bus of the IC card 25. The bus conversion is conducted in such a manner that the output signal from the address bus 32, the control bus 33, and the address establishing circuit 36 are applied to the I/O control circuit 37, to produce the selection signal of each IC card 25 and the direction control signal for the reading out control and the writing in control are supplied to the bus control circuit 38. This conversion is a control similar to the track and the sector control of the FDD device. At the same time the data bus 34 is supplied to the bus control circuit 38, and thus a random access of the IC card 25 is enabled, whereby the device resembles the FDD device. Furthermore, the device uses a semiconductor element, making it possible to conduct tremendously (up to 10 times greater) high speed processing as compared with the conventional FDD device. Furthermore, the memory capacity can be freely and arbitrarily changed in an IC card unit because the IC card 25 is detachable.

A property of the device viewed from the function aspect, the default of part of the memory elements or an IC card does not become a fatal wound because the function can be easily recovered by replacing the same with a new IC card. Furthermore, even when a general purpose (standard) OS is changed, the change of the IC card in itself is not required, only a little modification of the bus conversion circuit 29 is required.

Figure 5:
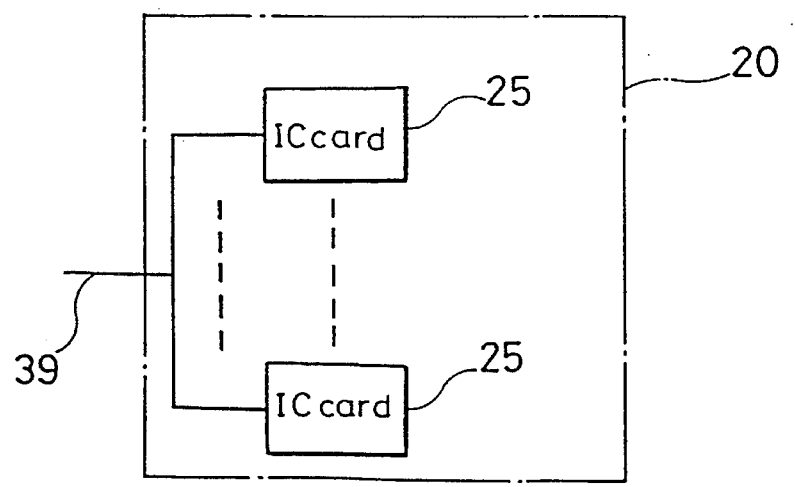
FIG. 5 is a diagram showing another embodiment of the present invention.
Figure 6:
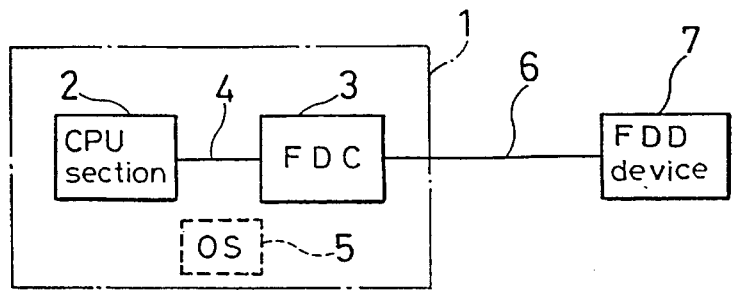
FIG. 6 is a diagram showing an external storing system of the conventional FDD device.
Figure 7:
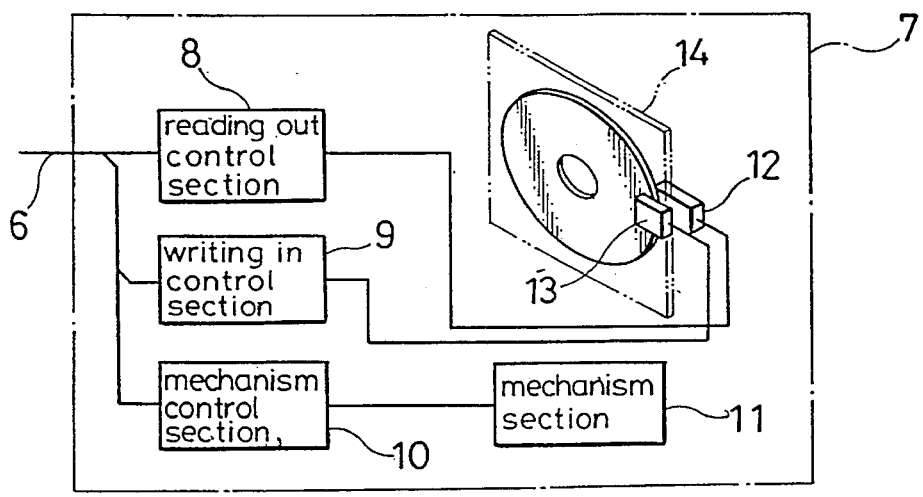
FIG. 7 is a diagram showing a basic construction of the FDD device.
Figure 8:
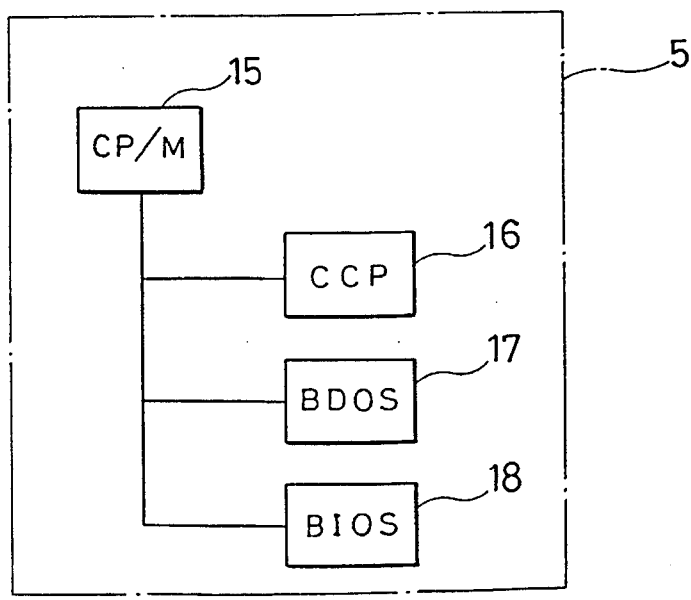
FIG. 8 is a diagram showing a construction of CP/M.
Figure 9:
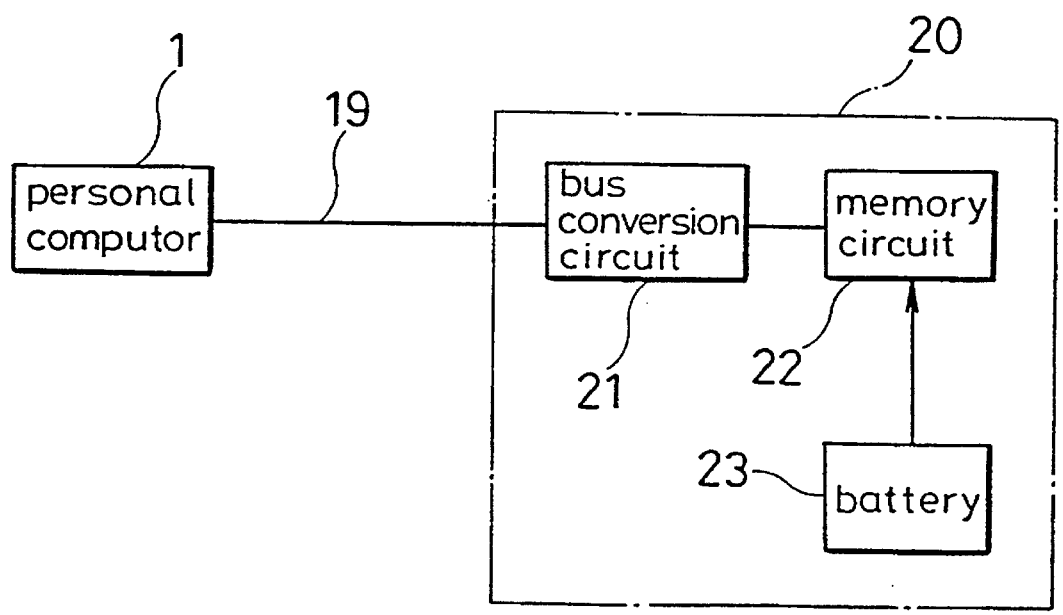
FIG. 9 is a diagram showing a conventional semiconductor disk device.

Furthermore, in the illustrated embodiment, a semiconductor disk device as an external memory device operating under a general purpose OS is described, where higher speed processing is enabled by connecting the semiconductor disk device to the system bus of the CPU as shown in FIG. 5. The IC card 25 is directly connected to the memory bus 39.

Furthermore, the memory element of the IC card is not limited to the static RAM, but an EEPROM, EPROM, or mask ROM as other memory elements can be mounted, resulting in an enlargement of the use. That is, when an EEPROM is mounted, a battery is not required, whereby a much thinner portable memory device is realized. Furthermore, it is possible to realize the mounting of a system program on an EPROM or a mask ROM and to produce the CPU in an IC card, thereby enabling the standardization, miniaturization, and high functionalization of the apparatus. Furthermore, it is possible to utilize the bus conversion circuit 29 for different kinds of devices by making the bus conversion circuit 29 a portable type one to which an IC card is detachable, and by memorizing the differences between the OSs and the hardware differences between the personal computers of various companys in an IC card, that is, providing an IC card sized bus conversion circuit for each kind of card reading device.

Furthermore, it is possible to enhance the value of the information possessed by each terminal to a great extent by making the most of the properties possessed by the IC card. The property of portably holding information by the conducting of operations at other terminals (a key I/O, display processing, print out, or image input machine) operating under the general purpose OS by the use of the IC card.

As evident from the foregoing description, according to the present invention, a card sized IC card having a size about 54×85.6 mm by the thin mounting production technique is used as a principal memory material, and a semiconductor disk device is formed by combinating the IC card singly or plurally to produce a high speed and high reliability miniaturized external memory device. This enables the portably holding the stored information, utilizing the information in other terminals, and exchanging the information easily. This provides a convenient device for practical use and a device having a large application range.

What is claimed is:

1. A semiconductor disk system operable in a basic input/output system, the basic input/output system processing communication signals of electronic hardware in a standard operating system comprising:

bus conversion means, operatively connected to said basic input/output system, for converting bus control signals for operating a floppy disk drive device, from said basic input/output system, to bus control signals for an integrated circuit card means, said bus conversion means being formed as a plurality of integrated circuit cards, each integrated circuit card forming said bus conversion means being associated with a different kind of card reading device and functioning as said bus conversion means when said semiconductor disk system is connected to said associated card reading device;

said integrated circuit card means, operatively connected to said bus conversion means, for providing a principle memory element for said semiconductor disk device; and a card connector, integral of said semiconductor disk device, for attaching said integrated circuit card means to said semiconductor disk device;

said integrated circuit card means consisting essentially of, a connector, operatively connected to said card connector of said semiconductor disk device, memory means, responsive to said bus control signals from said bus conversion means, integrated on said integrated circuit card means, for providing a memory medium, and power means, operatively connected to said memory means and integrated on said integrated circuit card, for supplying power to said memory means to preserve said memory means;

said integrated circuit card means being detachable from said semiconductor disk device via said connector to provide interchangeability of said principle memory elements on said semiconductor disk device.

2. The semiconductor disk device, as claimed in claim 1, further comprising:

bus means, connected to said bus conversion means, for providing a bus path between said bus conversion means and said basic input/output system of said operating system.

3. The semiconductor disk device, as claimed in claim 1, further comprising:

a plurality of attachments means, integral of said semiconductor disk device, for providing a multiplicity of sites to attach multiple said integrated circuit card means to said semiconductor disk device;

said integrated circuit card means providing a multiple of memory configurations for said semiconductor disk device, thereby enabling expansion of a memory capacity of the semiconductor disk device.

4. The semiconductor disk system as claimed in claim 1, wherein said bus conversion means comprises:

address establishing circuit means, operatively connected to said basic input/output system, for formulating address signals for said semiconductor device;

input/output control circuit means, operatively connected to said address establishing circuit means and said basic input/output system, for producing input/output control signals for said semiconductor disk device; and bus control circuit means, operatively connected to said input/output control circuit means and said basic input/output system, for producing bus control signals for said semiconductor disk device.

* * * * *